4,545,800

United States Patent [19]
Won et al.

[11] Patent Number: 4,545,800
[45] Date of Patent: Oct. 8, 1985

[54] SUBMERGED OXYGEN-HYDROGEN COMBUSTION MELTING OF GLASS

[75] Inventors: Kwang J. Won, Murraysville; George A. Pecoraro, Lower Burrell, both of Pa.

[73] Assignee: PPG Industries, Inc., Pittsburgh, Pa.

[21] Appl. No.: 632,506

[22] Filed: Jul. 19, 1984

[51] Int. Cl.⁴ ............................................... C03B 5/16
[52] U.S. Cl. .................................... 65/134; 65/135; 65/136; 65/335; 65/337; 75/10; 75/40; 75/92
[58] Field of Search .................. 65/138, 135, 335, 136, 65/337; 75/40, 10, 92

[56] References Cited

U.S. PATENT DOCUMENTS

| | | |
|---|---|---|
| 2,331,052 | 10/1943 | Shadduck . |
| 2,557,650 | 6/1951 | Gilliland .................. 75/40 |
| 2,718,096 | 9/1955 | Henry et al. . |
| 2,900,975 | 8/1959 | Northcott . |
| 2,923,615 | 2/1960 | Pearce ...................... 75/40 |
| 3,032,410 | 5/1962 | O'Day ...................... 75/10 R |
| 3,165,452 | 1/1965 | Williams ................... 202/53 |
| 3,170,781 | 2/1965 | Keefer . |
| 3,224,855 | 12/1965 | Plumat . |
| 3,237,929 | 3/1966 | Plumat et al. . |
| 3,248,205 | 4/1966 | Dolf et al. .............. 65/335 |
| 3,260,587 | 7/1966 | Dolf et al. .............. 65/136 X |
| 3,279,912 | 10/1966 | Death et al. ............ 75/10 R |
| 3,385,686 | 5/1968 | Plumat et al. ............ 65/335 |
| 3,592,622 | 7/1971 | Shepherd ................ 65/337 X |
| 3,606,825 | 10/1971 | Johnson . |
| 3,627,504 | 12/1971 | Johnson et al. . |
| 3,717,139 | 2/1973 | Guillet et al. ........... 126/360 A |
| 3,738,792 | 6/1973 | Feng . |
| 3,764,287 | 10/1973 | Brocious . |
| 3,775,081 | 11/1973 | Williams et al. .......... 65/134 |
| 3,788,832 | 1/1974 | Nesbitt et al. ............ 65/134 |
| 3,960,532 | 1/1976 | Lazet ...................... 65/134 X |
| 4,203,761 | 5/1980 | Rose ........................ 75/40 |

FOREIGN PATENT DOCUMENTS 1159647 8/1967 United Kingdom .

Primary Examiner—Arthur Kellogg
Attorney, Agent, or Firm—Dennis G. Millman

[57] ABSTRACT

Molten material is heated by submerged combustion of hydrogen with oxygen so that the product of combustion injected into the melt is low in volume and consists essentially of water vapor which is relatively soluble in a material such as molten glass. Preferred embodiments involve liquefying the batch materials in a first stage and subjecting the liquefied materials to submerged combustion in a second stage.

17 Claims, 3 Drawing Figures

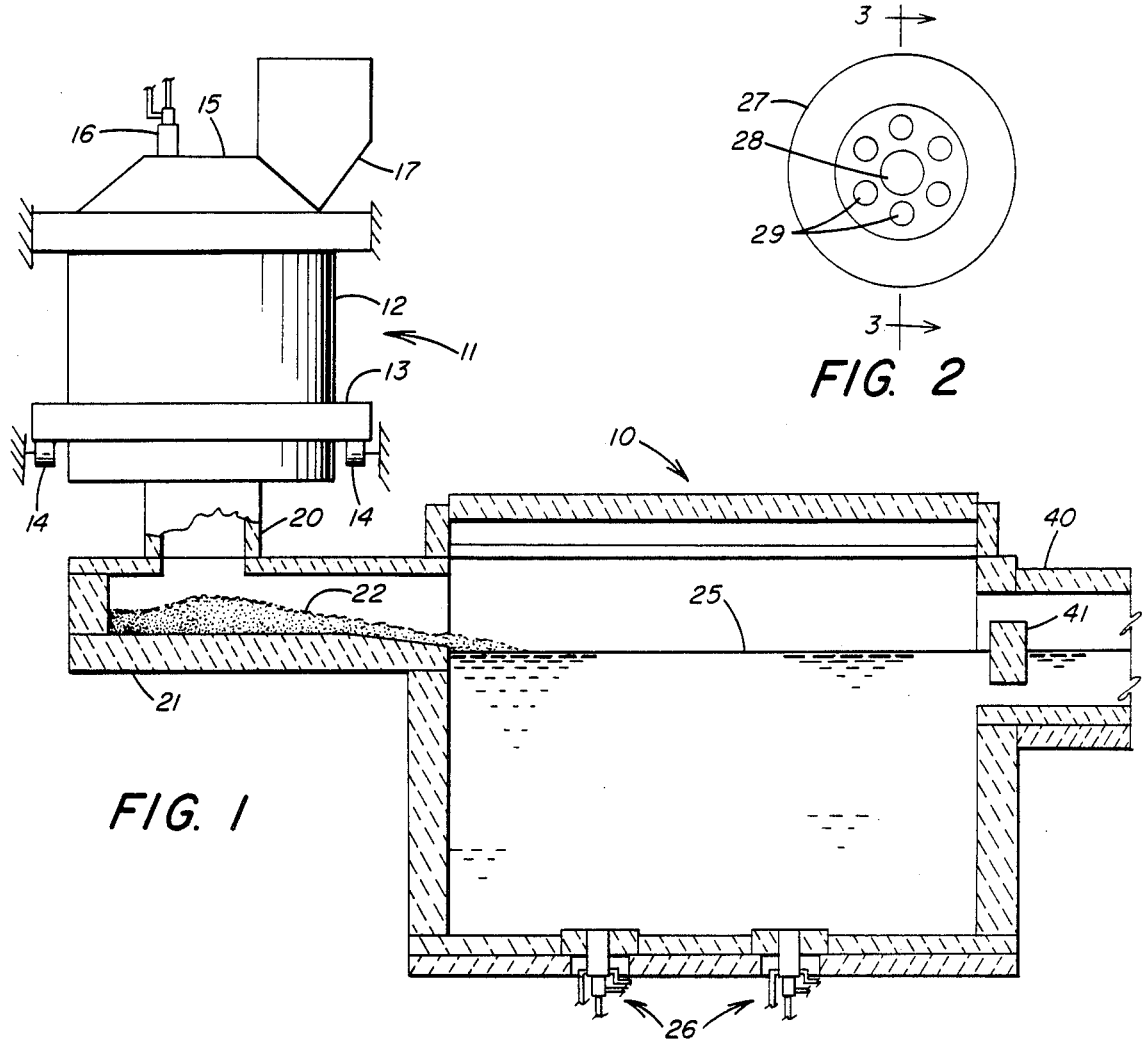
FIG. 2
FIG. 1
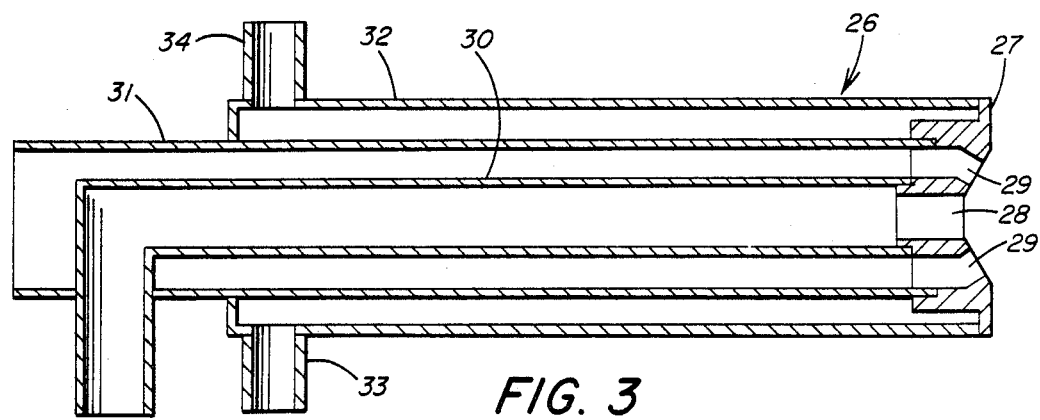
FIG. 3

SUBMERGED OXYGEN-HYDROGEN COMBUSTION MELTING OF GLASS

BACKGROUND OF THE INVENTION

This invention relates to melting of glass and the like, and in particular, to improvements in the use of submerged combustion in the the melting process.

The use of submerged combustion to melt glass has been proposed in several patents including U.S. Pat. Nos. 3,170,781; 3,224,855; 3,237,929; 3,260,587; 3,606,825; 3,627,504; 3,738,972; and 3,764,287. In submerged combustion, the combustion gases are injected beneath the surface of a molten pool and are permitted to percolate upwardly through the melt. An advantage of such an approach is that the material being heated is in intimate contact with the combustion gases and the thermal energy released therefrom, thereby yielding very favorable heat exchange rates. Another advantage is that the injection of the gases into the melt produces a high degree of stirring which can be beneficial in some melting processes.

However, a significant drawback of submerged combustion is that the injection of large volumes of gas into the melt is in some cases difficult to reverse. In other words the melt, in particular, glass, can sometimes be converted into a foamy condition, and subsequently collapsing the foam can be difficult. This tendency of submerged combustion to increase the gaseous content of the melt has been a deterrent for the acceptance of submerged combustion in the glassmaking industry, since one of the objectives of the glass melting process is to eliminate as much as possible bubbles and other gaseous inclusions from the molten glass. Proposals for using submerged combustion to melt glass have generally limited its application to the initial stages of the melting process to avoid increasing gaseous inclusions during the later stages of the melting and refining process.

SUMMARY OF THE INVENTION

In the present invention, submerged combustion is utilized for melting glass or the like without creating an excessive gaseous phase in the melt by using hydrogen as the fuel and oxygen as the oxidant. By employing oxygen rather than air, injection of nitrogen into the melt is avoided, thus substantially reducing the volume of gas introduced into the melt. Avoiding the introduction of nitrogen into the melt is also advantageous in that nitrogen is poorly soluble in molten glass. By using hydrogen as the fuel rather than hydrocarbons, the introduction of carbon dioxide, which is also poorly soluble in molten glass, into the melt is avoided. On the other hand, the product of combustion of oxygen-hydrogen combustion is water vapor which is highly soluble in molten glass. Thus the present invention reduces the volume of the gaseous phase produced by submerged combustion, and the gas that is introduced into the melt is one that is easily assimilated into the liquid phase. It is another advantage that oxygen-hydrogen combustion produces relatively high temperatures, which improves the rate of heat transfer to the melt.

In preferred embodiments, submerged combustion is utilized in a second stage of a glass melting process following an initial glass batch liquefying stage. The majority of the required thermal input for converting raw batch materials to refined molten glass is imparted in the first stage by means particularly suited to the liquefaction process (e.g., the type of process disclosed in U.S. Pat. No. 4,381,934). The liquefied, but only partially melted material, is then passed to the second stage where it is heated by submerged combustion. In this second stage, the requirement of the thermal input is only to raise the temperature of the material from its liquefaction temperature to a temperature suitable for completing the melting process and for refining the glass, i.e., driving off the gaseous inclusions. Whereas the temperature increase in the first stage is typically on the order of 2000° F., the second stage typically entails a temperature increase on the order of only a few hundred degrees. Because of the modest thermal requirements of the second stage, the submerged combustion entails a minimum volume of combustion gases being injected into the melt, thereby minimizing the foaming effect while efficiently accomplishing the process objectives of that stage. At the same time, the agitation of the melt by the submerged combustion benefits the overall process by improving the homogeneity of the glass and aiding the dissolution of the sand grains. By employing submerged oxygen-hydrogen combustion as a second stage heating process downstream from an initial liquefying stage, the increase in the gaseous phase due to submerged combustion is limited to practical levels that are compatible with the goal of producing thoroughly melted, refined glass.

THE DRAWINGS

FIG. 1 is a vertical cross-section of a submerged combustion glass melting apparatus in combination with a first stage liquefaction vessel.

FIG. 2 is an enlarged top view of a multi-port burner of the type which may be employed in the present invention.

FIG. 3 is an enlarged longitudinal cross-sectional view of the burner depicted in FIG. 2 taken along line 3—3 in FIG. 2.

DETAILED DESCRIPTION

FIG. 1 depicts an example of the preferred embodiment of the invention wherein a submerged combustion chamber 10 is downstream from a batch liquefaction stage 11. The preferred type of liquefaction stage shown in the drawing is the type disclosed in U.S. Pat. No. 4,381,934 and U.S. Pat. Application Ser. No. 481,970 filed Apr. 4, 1983, both to Kunkle et al., the disclosures of which are hereby incorporated by reference. This type of liquefaction process is characterized by radiant heat transfer to a sloped layer of batch materials, providing rapid run-off of the liquefied material. The particular embodiment shown here includes a drum 12 mounted for rotation about a vertical axis by way of a support ring 13 and rollers 14. A stationary lid 15 is provided with openings for insertion of at least one combustion burner 16 and for passage of batch materials into the vessel and exhaust gases out of the vessel by way of a duct 17. The batch materials fed to the rotating drum 12 assume the configuration of a paraboloid lining on the interior walls, sloping toward a central drain opening (not shown) at the bottom of the drum. This type of liquefying arrangement has been found to be advantageous for liquefying soda-lime-silica glass, but it should be understood that for purposes of the present invention other liquefying arrangements as are known in the art may be employed. For example, a shortened open-hearth type or electrical-resistance type glass melter may be employed as the initial stage. Processing other types of glass, or other materials such as ceramics, frits or ores, may utilize a liquefaction stage particularly adapted to that material.

Liquefied glass batch drained from the first stage liquefaction vessel is typically in a foamy condition including unmelted grains of the batch material. In the embodiment shown in FIG. 1, the liquefied material falls through a cylindrical collar 20 into a receiving vessel 21 where a body of the foamy material 22 may accumulate. The liquefied material may be fed directly from the liquefaction stage 11 into the submerged combustion vessel 10, but is is preferred to provide the intermediate vessel 21 for the sake of surge capacity and to improve accessibility to the underside of the liquefaction vessel 11. The intermediate vessel may be essentially a ramp leading to the submerged combustion chamber as shown, or it may be provided with a more significant volume to provide additional residence time for the material and may be provided with means to heat the material or to provide other treatments.

The submerged combustion chamber 10 is essentially a refractory box adapted to hold a pool 25 of the molten material of a substantial depth. In the example shown in FIG. 1, the submerged combustion vessel is provided with two submerged combustion burners 26 but the number of burners may be greater or less depending upon the heating requirements of a particular application. The burners 26 extend through the floor of the vessel, but a sidewall installation is also possible. It is also feasible to orient the burners obliquely to the walls of the vessel.

The specific burner construction is not critical to the present invention, but details of an example of a burner construction suitable for use with the present invention may be seen in FIGS. 2 and 3. The upper end of the burner is comprised of a cap 27 which is preferably provided with a port arrangement having a central port 28 surrounded by a plurality of ports 29. Typically, the oxidizing gas is provided through the central port 28 and the fuel gas through the surrounding ports 29, but the opposite arrangement is also feasible. In the preferred method employing oxygen-hydrogen combustion the oxygen is fed through the port 28 and the hydrogen through the ports 29. Referring now to FIG. 3 in particular, the central port 28 is supplied from a central conduit 30. A larger conduit 31 surrounds the central conduit 30 so as to create an annular space therebetween through which the ports 29 are supplied. Surrounding both conduits is a cooling jacket 32 establishing an annular space between the conduit 31 and the jacket 32 through which cooling medium such as water may be circulated to preserve the burner in the high temperature environment. Preferably the annular space for the cooling medium is provided with partitions (not shown) to create a flow path for the cooling medium in which the cooling medium circulates from an inlet 33, to the vicinity of the end cap 27, and back toward an outlet 34. In some submerged combustion arrangements combustion is carried out within the burner and the exhaust gases are injected into the melt, but the preferred technique here, using the type of burner shown, is to inject both the fuel and oxidant into the melt and to permit combustion to take place within the melt. In this manner, the energy released by the combustion passes directly to the molten material. Additionally, by providing for combustion outside the burner, the conditions to which the burner is subjected are less severe, thereby lessening durability requirements.

An outlet canal 40 leads from the submerged combustion chamber 10 to a glass forming operation. Preferably, a generally quiescent condition is provided in the canal 40 to permit bubbles to escape from the melt and to permit the melt to cool to an appropriate temperature for the forming process. To prevent any foam floating on the surface of the melt 25 in the submerged combustion chamber 10 from entering the canal 40, it is preferred to provide a surface barrier 41 at the entrance to the canal 40.

The fuel and oxidant supplied to the submerged combustion burners 26 must, of course, be at a pressure sufficient to overcome the hydrostatic head of the melt 25 above them. The pressure required in a particular case will depend upon the density of the melt as well as its depth, but by way of illustration it has been found that a 2 foot (0.6 meter) depth of foamy molten soda-lime-silica glass requires a gas pressure on the order of 5 pounds per square inch (34,500 Pa). The amount of fuel supplied to the burners will depend upon the thermal requirements of the particular application, the heat content of the fuel used, and the efficiency of the heat transfer to the molten material. In heating sode-lime-silica glass from about 2300° F. (1260° C.) to about 2800° F. (1540° C.), a heat transfer efficiency of about 70 percent has been found to be attainable. Hydrogen has a thermal content of about 275 BTU per cubic foot (10.4 joules per cubic centimeter) or 325 BTU per cubic foot (12.2 joules per cubic centimeter) including heat of vaporization).

For a material such as flat glass, for which a somewhat oxidized condition is usually desired, an excess of oxygen beyond that required for combustion is preferably supplied to the burners. Moreover, the thorough agitation and intimate gas/liquid contact achieved by the submerged combustion chamber make it very suitable for adjusting the oxidation state of the melt or other chemical properties thereof. For example, the liquefaction stage may be operated under reducing conditions and the molten glass may be oxidized in the submerged combustion chamber. Conversely, it is also feasible to employ a shortage of oxygen in the submerged combustion chamber to render the melt to a more reduced condition. The ability to adjust the oxidation state of molten glass is useful for establishing the color and light transmittance properties of the glass. The system also lends itself to the addition of colorants or other additional ingredients at the submerged combustion chamber. The submerged combustion chamber may be suitable mixing and/or reacting vessel in which a plurality of separately liquefied constituents may be brought together. In this regard, a plurality of the liquefying vessels 11 may feed into a submerged combustion chamber.

The advantage of employing combustion of hydrogen with oxygen, wherein the product of combustion consists essentially of water vapor, can be seen in the following comparison of the solubilities of gases in molten glass at saturation as reported in the literature:

| Gas | Solubility (at 1400° C.) |
| --- | --- |
| $N_2$ | $0.56 \times 10^{-6}$ gm/cc |
| $CO_2$ | $80 \times 10^{-6}$ |
| $H_2O$ | $2700 \times 10^{-6}$ |

The solubilities in molten glass of nitrogen, the major constituent of air, and carbon dioxide, the chief product of combustion of a hydrocarbon fuel, are much less than that of water. Thus, by avoiding the use of air and hydrocarbon fuel, some of the less soluble species can be excluded from the gaseous phase in the melt, leaving essentially only the highly soluble water vapor to be assimilated into the melt. Also, by using oxygen instead of air, the volume of oxidant gas injected into the melt is reduced to about one-fifth.

It should be understood that oxygen-hydrogen submerged combustion yields advantages apart from the preferred two stage arrangement. Therefore, broader aspects of the invention include feeding raw batch materials directly into the submerged combustion chamber 10 heated by oxygen hydrogen combustion.

Another low gas volume, high temperature heat source that may be employed with the present invention is a plasma torch. A plasma torch uses a stream of carrier gas to project high temperature plasma produced by an electric arc beyond the orifice of the torch. The carrier gas may be a combustible gas, or it may be non-reacting or even inert. For example, the carrier gas could advantageously be steam. Oxygen-hydrogen combustion may be carried out with a plasma torch, for example, by passing the hydrogen through a plasma generator and then into the melt while separately injecting oxygen directly into the melt. Oxygen would also be suitable as a carrier gas because its solubility in molten glass is almost as high as that of water. Helium may also be suitable in spite of its relatively poor solubility because it has very high diffusivity in molten glass. Each of these examples advantageously avoids introducing nitrogen or carbon dioxide into the melt.

Summarizing, the heat source for the submerged combustion may be the heat of combustion being released from a gas that is undergoing combustion in the submerged combustion chamber or has undergone combustion immediately prior to being injected into the chamber, or it may be thermal energy released from a gas that has been electrically excited. These may be referred to generically as radiating gases. Additional heat sources such as overhead combustion flames or electrical resistance heating may be employed in the submerged combustion chamber.

The submerged combustion chamber 10 is initially heated up while empty using the burners 26. The heated chamber may then be gradually filled with molten material from the liquefaction stage 11 or with raw glass batch or cullet. Once the molten pool 25 is established, the submerged burners may be stopped and restarted simply by turning the fuel off and on. When a burner is turned off, it is preferred to keep the melt from entering the burner and freezing by continuing to purge the burner with a gas, e.g., the oxidant gas flow may be continued.

The detailed description herein has related to specific embodiments for the sake of disclosing the preferred mode of the invention, but it should be understood that other modifications and variations as are known to those skilled in the art may be resorted to without departing from the spirit and scope of the invention as defined by the claims which follow.

We claim:

1. A method of heating a body of melting glass or the like by submerged combustion wherein combusting gas is injected into the body of the melting material from beneath its surface, the submerged combustion comprising combustion of fuel that is predominantly hydrogen and an oxidant that is predominantly oxygen, whereby the product of the submerged combustion introduced into the melting body is predominantly water vapor, thereby reducing the creation of bubbles in the melting body.

2. The method of claim 1 wherein the fuel is substantially free of carbon.

3. The method of claim 1 wherein the oxidant is substantially free of nitrogen.

4. The method of claim 1 wherein the oxidant consists essentially of oxygen.

5. The method of claim 1 wherein the fuel is combined with the oxidant after being injected into the melting body.

6. The method of claim 1 wherein the fuel is combined with the oxidant before being injected into the melting body.

7. The method of claim 1 wherein the fuel is essentially hydrogen and the oxidant is essentially oxygen.

8. The method of claim 1 wherein the melting body includes partially melted glass batch.

9. The method of claim 8 wherein partially melted glass batch is fed to the melting body from a separate liquefying stage.

10. The method of claim 9 wherein the material being fed to the melting body is at a temperature of at least 2000° F.

11. The method of claim 10 wherein the temperature of the material entering the melting body is increased by the submerged combustion.

12. The method of claim 1 wherein oxygen is supplied to the melting body in an amount in excess of that required for combustion of the fuel.

13. A method of heating a body of melting glass or the like, comprising injecting into the melting body beneath its surface a plasma stream having a carrier gas that has a lower concentration of nitrogen than air and is substantially free of substances that combust to form carbon oxides, whereby heat is transferred to the melting body from the injected gas and introduction of carbon oxides into the melting body is substantially avoided.

14. The method of claim 13 wherein the carrier gas is steam.

15. The method of claim 13 wherein the carrier gas includes oxygen.

16. The method of claim 13 wherein the carrier gas includes hydrogen.

17. The method of claim 13 wherein the carrier gas includes helium.

* * * * *